United States Patent

(12) United States Patent
Ito

(10) Patent No.: US 10,040,199 B2
(45) Date of Patent: Aug. 7, 2018

(54) APPARATUS AND METHOD FOR DETERMINING WORK TO BE PICKED

(71) Applicant: CANON KABUSHIKI KAISHA, Tokyo (JP)

(72) Inventor: Takafumi Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 15/228,186

(22) Filed: Aug. 4, 2016

(65) Prior Publication Data

US 2017/0057092 A1  Mar. 2, 2017

(30) Foreign Application Priority Data

Aug. 25, 2015 (JP) .................. 2015-166183

(51) Int. Cl.
*B25J 9/16* (2006.01)
*B25J 9/10* (2006.01)

(52) U.S. Cl.
CPC ........... *B25J 9/1697* (2013.01); *B25J 9/1612* (2013.01); *B25J 9/1679* (2013.01); *B65G 2203/041* (2013.01); *G05B 2219/40053* (2013.01); *G05B 2219/40609* (2013.01); *G05B 2219/45063* (2013.01)

(58) Field of Classification Search
CPC ...... B25J 9/1612; B25J 9/1679; B25J 9/1697; G05B 2219/40053; G05B 2219/40609; G05B 2219/39393; G05B 2219/45063; B65G 47/905; B65G 2203/041
See application file for complete search history.

(56) References Cited

U.S. PATENT DOCUMENTS

| | | | |
|---|---|---|---|
| 9,302,391 B2 | 4/2016 | Iio et al. | |
| 2004/0019405 A1* | 1/2004 | Ban ........................ | B25J 9/1697 700/213 |
| 2007/0274812 A1* | 11/2007 | Ban ........................ | B25J 9/1697 414/217 |
| 2011/0301744 A1* | 12/2011 | Ichimaru ................ | B25J 9/1687 700/214 |
| 2012/0029686 A1* | 2/2012 | Ban ........................ | B25J 9/1679 700/218 |

(Continued)

FOREIGN PATENT DOCUMENTS

JP   2012125886 A   7/2012
JP     5201411 B2   6/2013

*Primary Examiner* — Dale Moyer
(74) *Attorney, Agent, or Firm* — Rossi, Kimms & McDowell LLP

(57) ABSTRACT

Provided is a processing apparatus for determining a work to be picked by a robot from a plurality of works, using an image, captured by an image capture device, of an area on which the plurality of works are placed. The apparatus selects a pickable candidate work based on the image, and determines a picking target work positioned in a partial area assigned with a highest priority among the partial areas where candidate works are respectively positioned. The apparatus selects a next pickable candidate work whose position and orientation have changed within allowable ranges before and after picking, and determines a next picking target work positioned in the partial area assigned with the highest priority among the partial areas where the next pickable candidate works are respectively positioned.

10 Claims, 9 Drawing Sheets

(56) References Cited

U.S. PATENT DOCUMENTS

| | | | |
|---|---|---|---|
| 2012/0158180 A1* | 6/2012 | Iio | B25J 9/1679 |
| | | | 700/259 |
| 2013/0094932 A1* | 4/2013 | Kutsukake | B25J 9/1697 |
| | | | 414/680 |
| 2013/0166061 A1* | 6/2013 | Yamamoto | B25J 9/1664 |
| | | | 700/214 |

* cited by examiner

F I G. 4
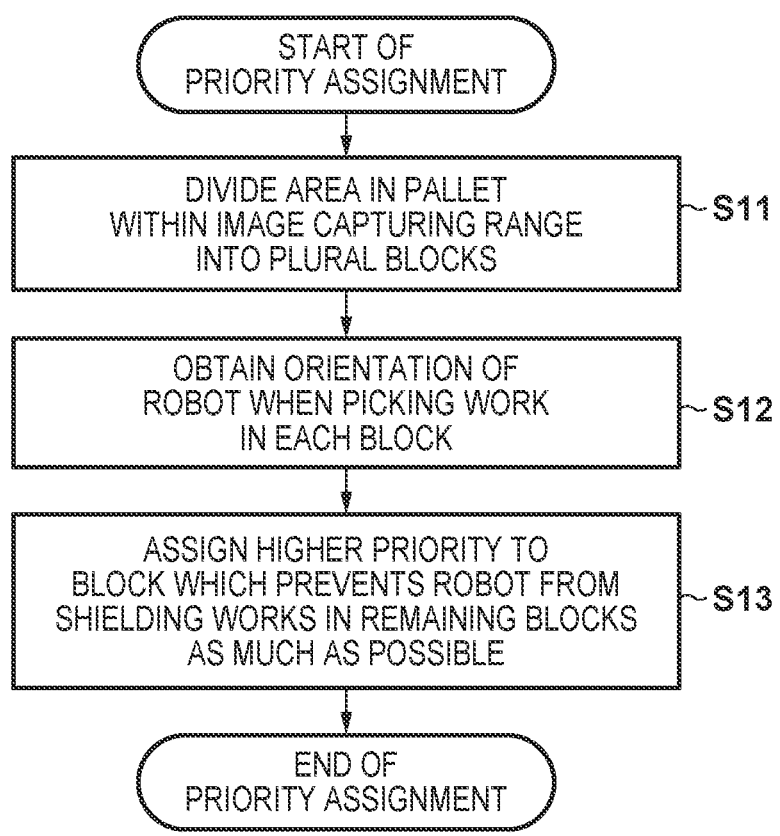

APPARATUS AND METHOD FOR DETERMINING WORK TO BE PICKED

BACKGROUND OF THE INVENTION

Field of the Invention

The present invention relates to a technique of recognizing a pickable work from piled works, and picking it.

Description of the Related Art

There has been developed a three-dimensional measurement apparatus for recognizing a pickable work and performing three-dimensional measurement for the work in order to pick, using an industrial robot, works irregularly piled on a pallet. As the three-dimensional measurement apparatus, there is known an apparatus for measuring the three-dimensional positions and orientations of piled works by capturing the works by emitting pattern light. When performing three-dimensional measurement, a plurality of pickable candidate works may be found from the piled works. Even if, however, a plurality of candidate works are found, it is common practice to pick one of the works, and then perform irradiation with pattern light and image capturing again, thereby repeating three-dimensional measurement.

Japanese Patent No. 5201411 describes a technique in which if a plurality of candidate works are found, it is determined whether the positions of the candidate works have changed, and if there exists a candidate work whose position remains unchanged, three-dimensional measurement is not repeated, thereby shortening a tact time. Japanese Patent No. 5201411 describes a method of comparing two images captured before and after picking in order to determine whether the positions have changed. However, Japanese Patent No. 5201411 does not mention which of the plurality of candidate works is determined as a picking target work. Thus, when an attempt is made to obtain an image after picking in order to determine a position change, if the arm of a robot shields a candidate work, it becomes impossible to recognize a change in the position of the shielded candidate work, and it is impossible to determine whether the work can be selected as a next picking candidate. Therefore, in the method described in Japanese Patent No. 5201411, when obtaining an image after picking, if there is a candidate work shielded by the arm of the robot, it is necessary to wait until the robot arm retreats from a position above a pallet, thereby disabling shortening of a tact time.

Japanese Patent Laid-Open No. 2012-125886 describes a technique in which when a robot arm picks one of candidate works, a shield ratio as a ratio of an area where the remaining candidate works are shielded to the entire area is calculated, and a candidate work having a lower shield ratio is preferentially picked. In Japanese Patent Laid-Open No. 2012-125886, this technique makes it possible to obtain an image, after picking, of candidate works other than a picking target work without waiting until the robot arm retreats from a position above a pallet.

Japanese Patent Laid-Open No. 2012-125886 discloses a technique of picking candidate works from a candidate work which prevents the robot arm from shielding the remaining candidate works as much as possible. However, Japanese Patent Laid-Open No. 2012-125886 poses a problem that a tact time cannot be shorten so much since a shield ratio is calculated for each candidate work and thus the calculation load is heavy.

SUMMARY OF THE INVENTION

The present invention, for example, shortens the tact time of picking.

According to one aspect of the present invention, there is provided a processing apparatus for determining a work to be picked by a robot from a plurality of works, using an image, captured by an image capture device, of an area on which the plurality of works are placed. Each of a plurality of partial areas of the area is assigned with a priority for a picking sequence, and when the robot picks a work positioned in one partial area, the priority for picking sequence is based on an area value of other partial areas shielded by the robot with respect to the image capture device. The processing apparatus obtains information of positions and orientations of the plurality of works based on the image, selects a pickable candidate work among the plurality of works based on the information, determines, if there exist a plurality of candidate works, as a picking target work, a candidate work positioned in the partial area assigned with a highest priority among the partial areas where the plurality of candidate works are respectively positioned, selects, as a next pickable candidate work, a candidate work whose position and orientation have changed within allowable ranges before and after picking, based on a result of comparison between an image of the area captured again by the image capture device after picking the target work and a preceding image captured by the image capture device before picking the target work, and determines, if there exist a plurality of next pickable candidate works, as a next picking target work, a next pickable candidate work positioned in the partial area assigned with the highest priority among the partial areas where the plurality of next pickable candidate works are respectively positioned.

Further features of the present invention will become apparent from the following description of exemplary embodiments (with reference to the attached drawings).

BRIEF DESCRIPTION OF THE DRAWINGS

FIG. 4 is a flowchart for assigning priorities to blocks according to the first embodiment;

DESCRIPTION OF THE EMBODIMENTS

Figure 1:
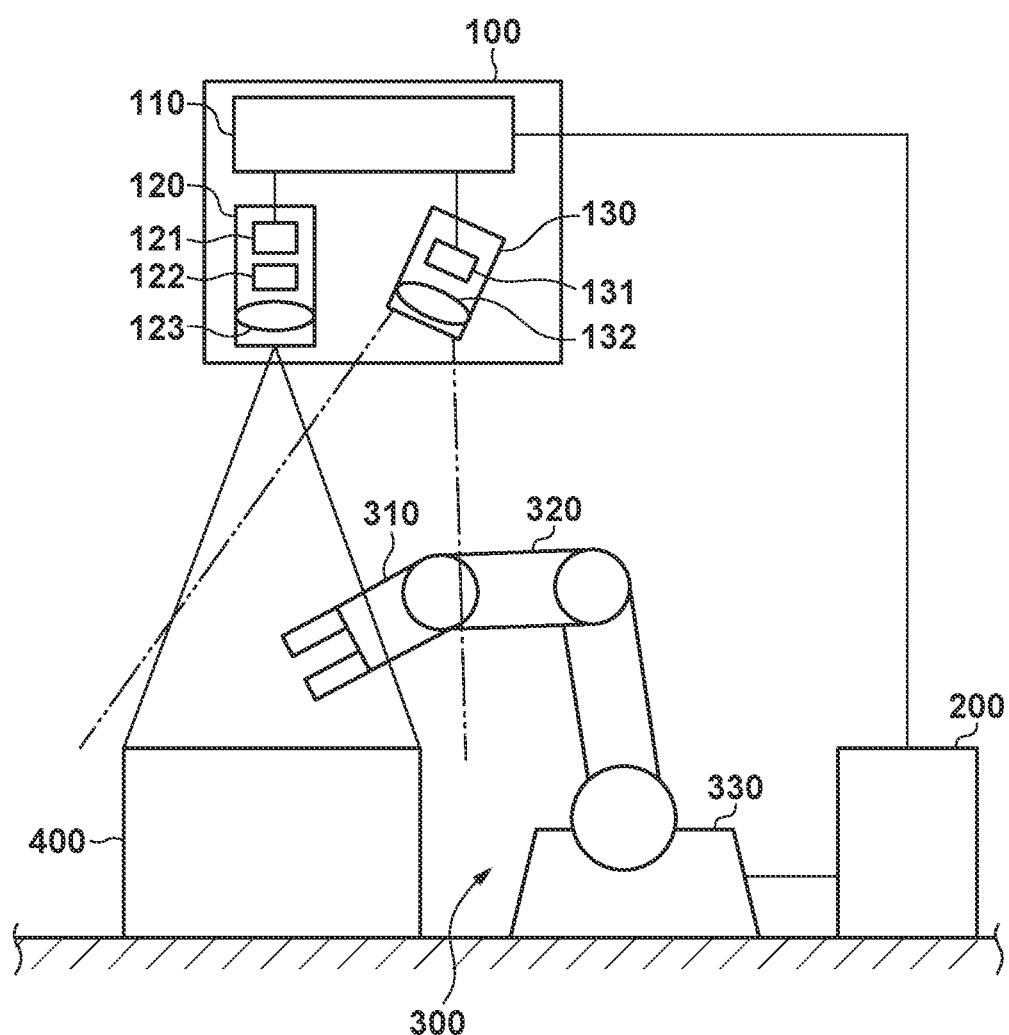
FIG. 1 is a view showing a picking system according to the present invention.

Various exemplary embodiments, features, and aspects of the invention will be described in detail below with reference to the drawings. Note that the same reference numerals denote the same members or elements and a repetitive description thereof will be omitted.

First Embodiment

The first embodiment of the present invention will be described below. Note that this embodiment will be described by assuming that a three-dimensional measurement apparatus including an image capture device uses pattern projection. The present invention, however, is not limited to this, and other forms may be adopted. FIG. 1 is a view showing the overall configuration of a picking system and a pallet (container) on which a plurality of works are placed according to the first embodiment. The normal measurement operation of the three-dimensional measurement apparatus according to the first embodiment will be described with reference to FIG. 1.

A three-dimensional measurement apparatus 100 includes a measurement controller 110, a light projector 120, and an image capture device 130. The light projector 120 includes a light source 121, a pattern light generator 122 for generating pattern light, and a projection optical system 123. The light source 121 is, for example, an LED. The pattern light generator 122 is, for example, a DMD (Digital Mirror Device). The image capture device 130 includes an image sensing element 131 and an imaging optical system 132. The image sensing element 131 is, for example, a CMOS image sensor or the like.

In accordance with a command from a processing apparatus 200, the measurement controller 110 for controlling the three-dimensional measurement apparatus 100 causes the light projector 120 to project pattern light on a pallet 400, and also causes the image capture device 130 to capture an area in the pallet 400 (container). The processing apparatus 200 is, for example, a computer apparatus. Note that the processing apparatus 200 may also function as the measurement controller 110. In the pallet 400, a number of works as picking targets of the picking system and as measurement targets of the three-dimensional measurement apparatus 100 are piled. The measurement controller 110 transmits the image capturing result of the image capture device 130 to the processing apparatus 200. The processing apparatus 200 recognizes the works in the pallet 400 and obtains position and orientation information based on data of an image captured by the image capture device 130, and selects a pickable candidate work. The information of the pickable candidate work is transmitted from the processing apparatus 200 to a robot 300, and the robot 300 moves a hand 310 and an arm 320 based on the information and picks the predetermined work. In the conventional measurement operation of the three-dimensional measurement apparatus, the above steps are repeatedly performed every time the robot 300 picks a work.

Figure 2:
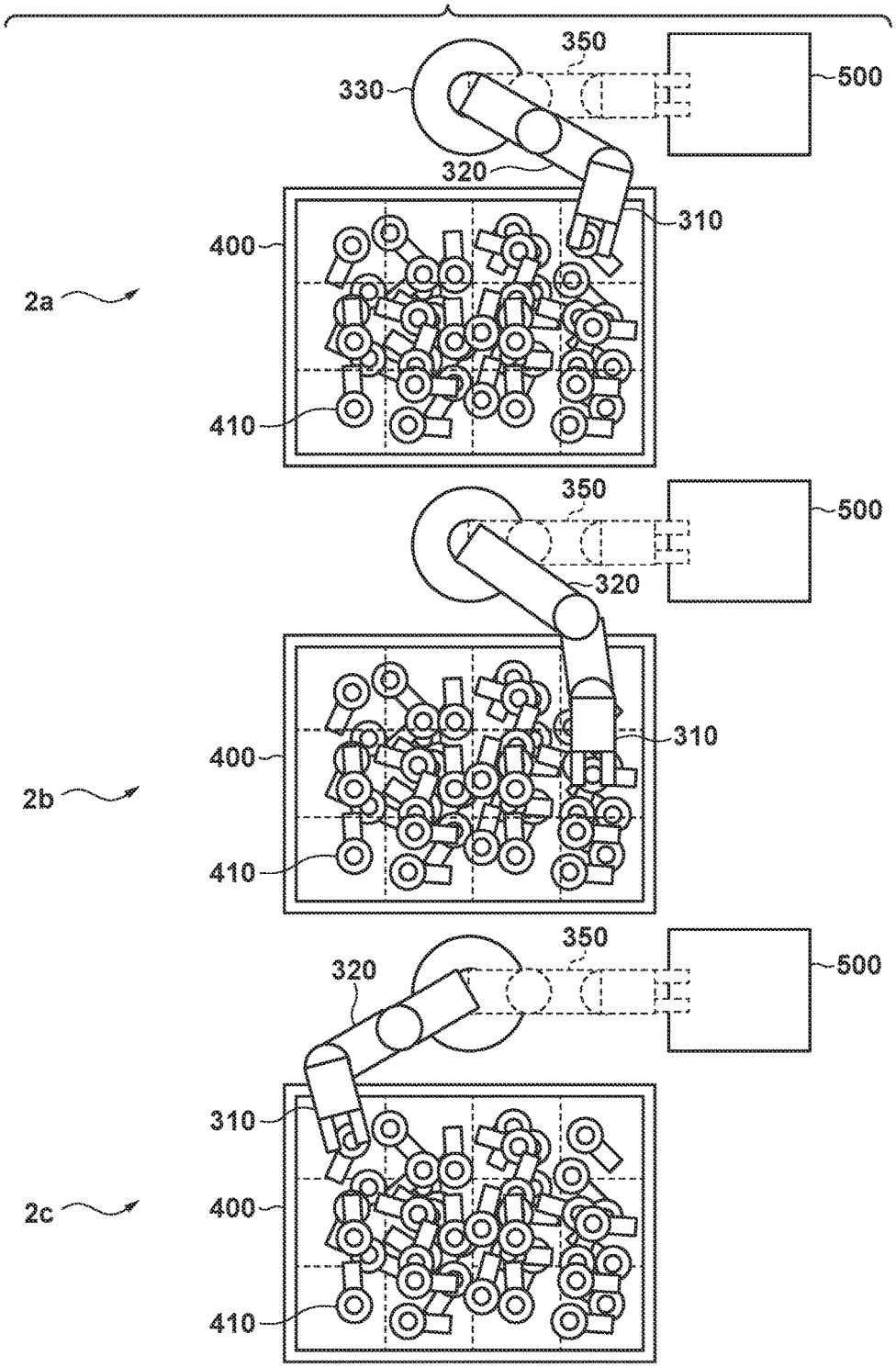
FIG. 2 is a view for explaining a method of assigning priorities to blocks.

A method of determining a target work to undergo a picking operation according to the present invention will be described next. FIG. 2 is a view showing the robot 300 and the pallet 400 when viewed from the installation position of the three-dimensional measurement apparatus 100. In FIG. 2, the pallet 400 is divided into 12 blocks (partial areas) by dotted lines, and this block division corresponds to block division on the captured image.

In FIG. 2, 2a shows the orientation of the robot 300 when picking a work in the block at the upper right end among a number of works 410 piled in the area in the pallet 400. The robot 300 attempts to pick a work in the block at the upper right end in FIG. 2 by moving the arm 320 and the hand 310 as indicated by solid lines from a retreat position 350 indicated by dotted lines. At this time, as is apparent from FIG. 2, when viewed from the position of the three-dimensional measurement apparatus 100, the arm 320 and the hand 310 do not shield the works in the blocks other than the block at the upper right end in FIG. 2.

In FIG. 2, 2b shows the orientation of the robot 300 when picking a work in the block at the middle right end in FIG. 2. At this time, when viewed from the position of the three-dimensional measurement apparatus 100, the arm 320 and the hand 310 shield the works in the block at the upper right end in addition to the block at the middle right end. Therefore, to set priorities for a picking sequence to the blocks so as not to shield the works as many as possible, the priority of the block at the upper right end needs to be set higher than that of the block at the middle right end in FIG. 2.

In FIG. 2, 2c shows the orientation of the robot 300 when picking a work in the block at the upper left end. At this time, as is apparent from FIG. 2, when viewed from the position of the three-dimensional measurement apparatus 100, the arm 320 and the hand 310 do not shield the works in the blocks other than the block at the upper right end, similarly to 2a. Note that the distance, from the retreat position 350 of the robot 300, of the block in which the picking target work is positioned is longer than that in 2a. Thus, the time taken for the arm 320 and the hand 310 to move to the position of the picking target work is longer in 2c than in 2a, and the number of works hidden on the traffic line is larger in 2c than in 2a. The priority of the block at the upper left end is set lower than that of the block at the upper right end. In this embodiment, as shown in 2a to 2c of FIG. 2, the priority of each block is assigned in advance based on the size of an area shielded by the arm 320 and the hand 310 according to the orientation of the robot 300 when picking a work in each block.

Figure 3:
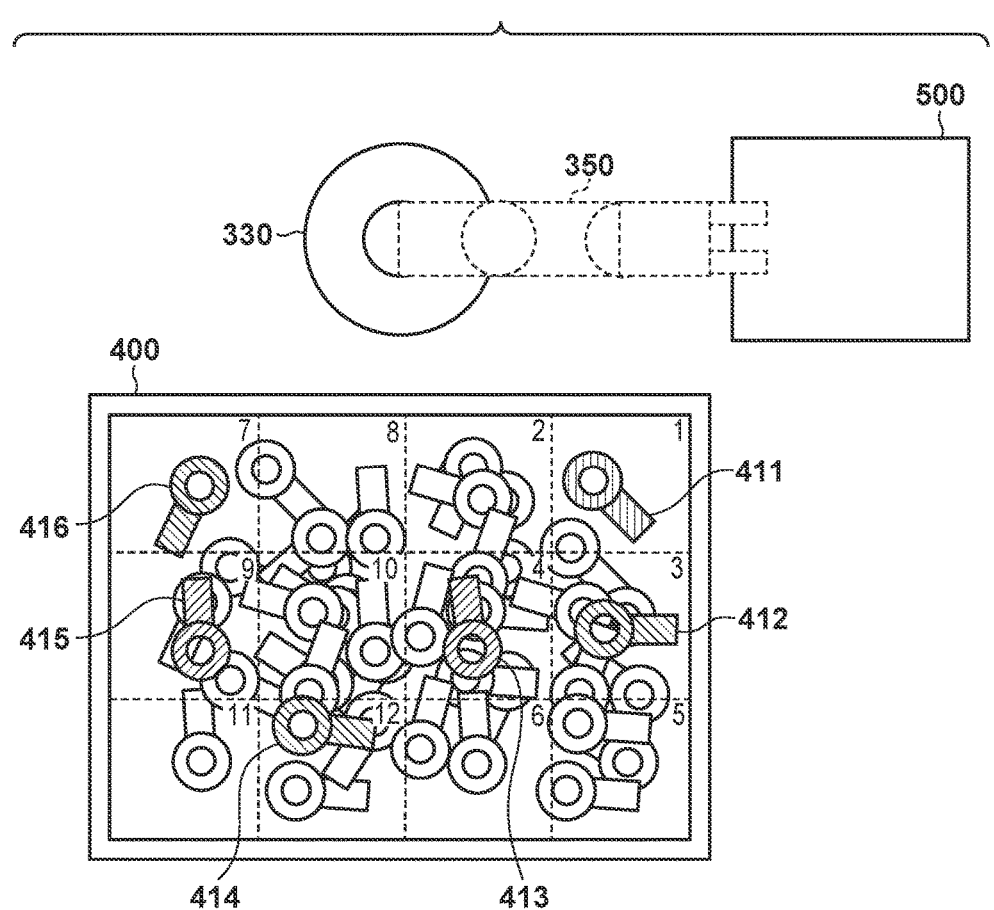
FIG. 3 is a view showing a result of assigning priorities to blocks according to the first embodiment.

FIG. 3 shows a priority assignment result according to this embodiment. Note that in this embodiment, the arm 320 and the hand 310 operate symmetrically with respect to the pallet 400, the priorities of the right blocks in FIG. 3 are higher than those of the left blocks, and the settings of the priorities of the right blocks are symmetric to those of the priorities of the left blocks. Numerals 1 to 12 described in the respective blocks of FIG. 3 represent the priorities of the respective blocks. In this example, priorities 1 to 6 of the six right blocks of the pallet 400 are set in a sequence such that the priority of the block at the upper right end in FIG. 3 is the highest, the priority of the block next to the left of that block is the second highest, the priority of the block at the middle right end is the third highest, . . . . With respect to the six left blocks of the pallet 400, the priority of the block at the upper left end is set to 7, and priorities up to priority 12 are set in a sequence such that the settings of the priorities are symmetric to those of the priorities of the right blocks.

As shown in FIG. 3, there are six candidate works from a pickable candidate work 411 to a pickable candidate work 416. In this case, in accordance with the priorities assigned to the blocks in which the respective candidate works are positioned, the picking sequence of the six candidate works 411 to 416 is set to "first candidate work 411→second candidate work 412→third candidate work 413→sixth candidate work 416→fifth candidate work 415→fourth candidate work 414". Note that the sequence of the priorities of the blocks shown in FIG. 3 is merely an example, and the present invention is not limited to this.

The procedure of assigning the priorities of the blocks, which has been explained, will be described with reference to a flowchart shown in FIG. 4. The priorities of the blocks may be assigned using an apparatus outside the picking system. In this embodiment, assume that the processing apparatus 200 performs an operation of assigning the priorities of the blocks. When the operation of assigning the priorities of the blocks starts, the processing apparatus 200 divides, in step S11, the area in the pallet 400 within an image capturing range into a plurality of blocks. In the example of FIG. 2, the area in the pallet 400 is equally divided into 12 rectangular blocks in the vertical and horizontal directions. In step S12, the processing apparatus 200 obtains the orientation of the robot 300, when viewed from the three-dimensional measurement apparatus 100, at the time of picking of a work in each block. The orientation of the robot 300 may be obtained by actual image capturing by the three-dimensional measurement apparatus 100, or by simulation using a three-dimensional CAD model or the like.

In step S13, based on the orientation of the robot 300 obtained in step S12, the processing apparatus 200 assigns the priorities of all the blocks by setting a higher priority to a block which prevents the robot from shielding the works in the remaining blocks as much as possible. At this time, criteria for assigning the priorities of the blocks may include setting criteria such as the distance to a conveyance destination 500 of a work in addition to a criterion that the works in the remaining blocks are not shielded as much as possible. As shown in FIG. 4, by assigning the priorities of the blocks before measurement, for example, at the time of installation of the three-dimensional measurement apparatus, it is possible to quickly pick a candidate work while preventing the robot from shielding the remaining candidate works as much as possible at the time of picking.

Figure 5:
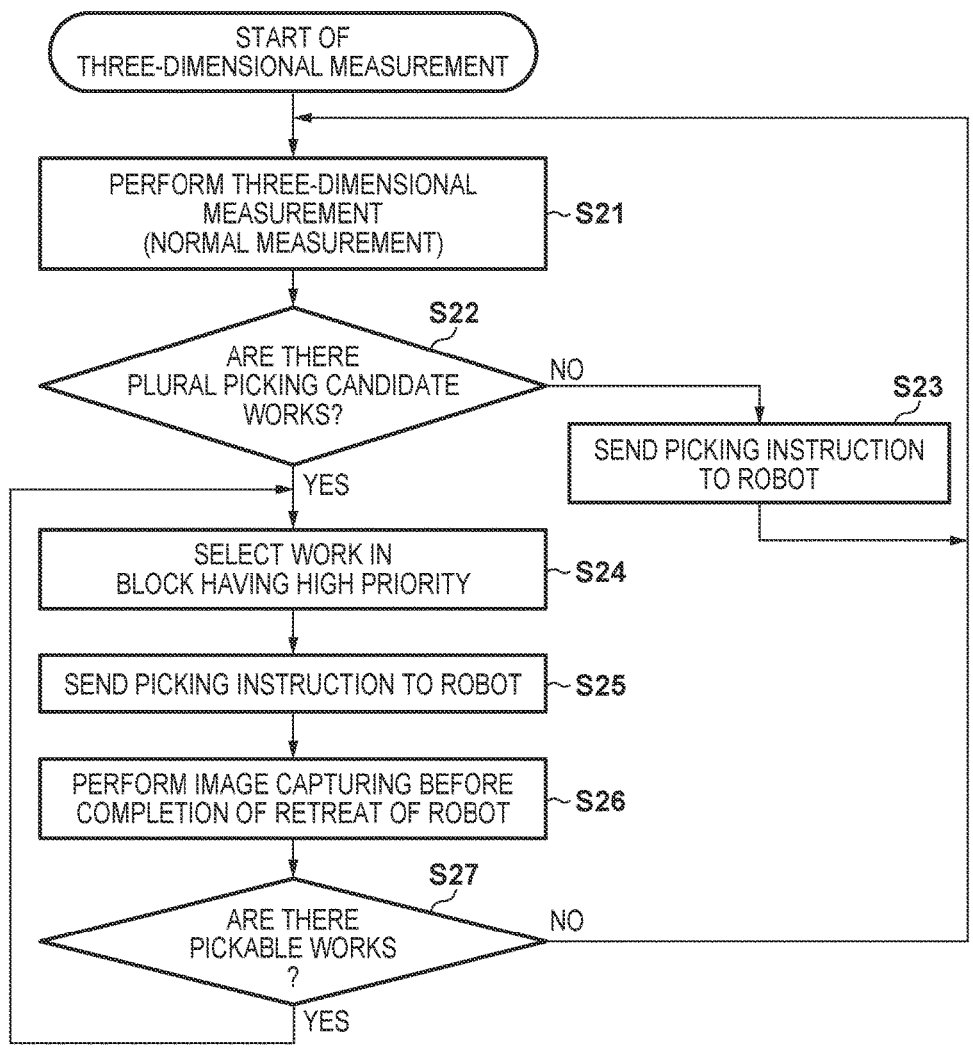
FIG. 5 is a flowchart illustrating image capturing and picking according to the first embodiment.

The procedure of measurement and picking according to the embodiment will be described with reference to a flowchart shown in FIG. 5. In step S21, the three-dimensional measurement apparatus 100 performs normal three-dimensional measurement. This three-dimensional measurement is implemented by, for example, a known technique of measuring the three-dimensional positions of works by projecting pattern light on the piled works and capturing the works, and a detailed description thereof will be omitted. In step S22, the processing apparatus 200 determines whether there exist a plurality of pickable candidate works among the piled works measured in step S21. If it is determined that there is only one pickable candidate work, the process advances to step S23, and the processing apparatus 200 commands the robot 300 to pick the candidate work. The process returns to step S21 to perform three-dimensional measurement. If it is determined in step S22 that there exist a plurality of pickable candidate works, the process advances to step S24. In step S24, based on preset block division information, the processing apparatus 200 determines the pickable work in the block having a high priority as a next picking target work. In step S25, the processing apparatus 200 commands the robot 300 to pick the target work.

After that, the robot 300 performs the picking operation of the determined target work. At this time, in step S26, after the robot 300 completes picking of the target work and before the robot 300 completes a retreat, the image capture device 130 captures the pallet 400 again. This is done to confirm in step S27 whether the picking operation of the robot 300 has changed the positions of the pickable candidate works other than the picked target work, and determine whether the candidate works can be subsequently picked. If among the pickable candidate works captured in step S21 before picking of the target work, there is a candidate work whose position remains unchanged during the picking operation of the robot 300, the information of the three-dimensional measurement result obtained in step S21 can be used intact. Therefore, whether there is a pickable candidate work may be determined in step S27 by obtaining changes in the position and orientation before and after picking based on a result of comparison between the image before picking and an image after picking. In addition, coarse position measurement may be performed using the captured image of picking, thereby performing determination.

If it is determined in step S27 that there are candidate works, the position and orientation of each of which have changed within allowable ranges before and after picking, it is possible to perform picking based on the original position information without performing three-dimensional measurement again, and thus the process returns to step S24. The processing apparatus 200 determines, as the next picking target work, a candidate work in the block having a higher priority among the works. On the other hand, if it is determined in step S27 that there is no pickable candidate work, it can be considered that all of the plurality of pickable candidate works measured first in step S21 have been picked, and thus three-dimensional measurement is performed again in step S21.

Figure 6:
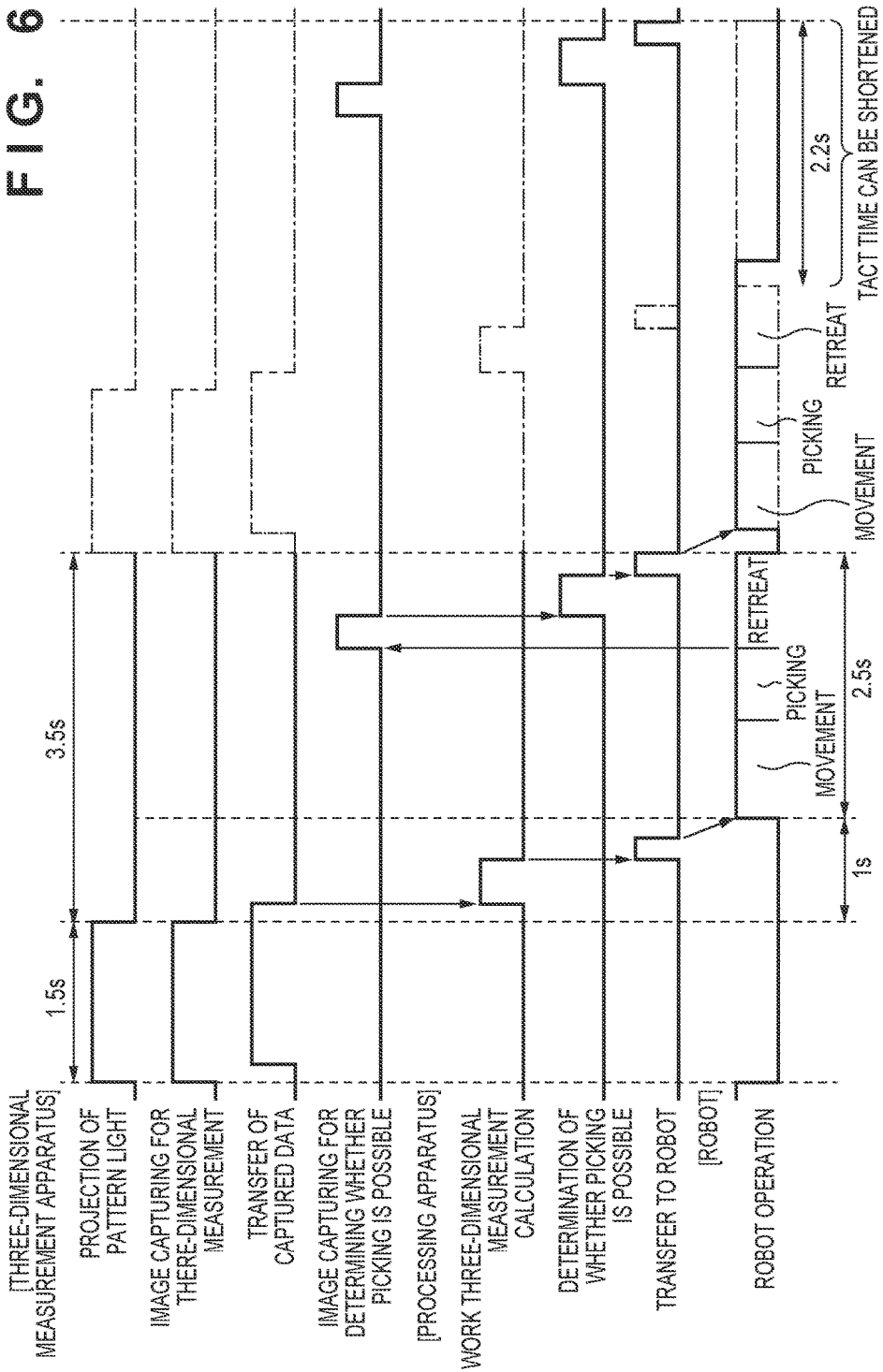
FIG. 6 is a timing chart showing image capturing and picking according to the first embodiment.

FIG. 6 is a timing chart showing measurement and picking according to the first embodiment. A timing chart when performing normal three-dimensional measurement will be described first. The three-dimensional measurement apparatus 100 according to this embodiment performs image capturing for three-dimensional measurement in synchronism with projection of pattern light. Irradiation with a plurality of kinds of patterns and a plurality of corresponding captured images are generally required for three-dimensional measurement. Therefore, it takes time to complete image capturing for three-dimensional measurement. In the example of this embodiment, assume that the time taken to perform image capturing for three-dimensional measurement is 1.5 sec. The three-dimensional measurement apparatus 100 transfers the obtained captured data to the processing apparatus 200, as needed. The processing apparatus 200 performs the three-dimensional measurement calculation of the works based on the captured data, thereby obtaining the positions and orientations of the works. The processing apparatus 200 transfers the information to the robot 300, and the robot 300 performs a picking operation based on the information. In the example of this embodiment, assume that a time from when image capturing for three-dimensional measurement is completed until the information of the positions and orientations of the works is transmitted to the robot 300 is 1 sec. Assume also that the time taken to perform the picking operation of the robot 300 is 2.5 sec. Note that in the picking operation, 1 sec is taken to move the robot 300, 0.5 sec is taken for picking, and 1 sec is taken for a retreat.

As described above, 5 sec is taken in total to perform normal three-dimensional measurement and complete the picking operation of the robot 300 based on the three-dimensional measurement result. In general, measurement and a picking operation are repeated in a tact time of 5 sec. To the contrary, the three-dimensional measurement apparatus 100 according to the present invention captures an image for determining whether picking is possible, after the picking operation of the robot 300 ends and before the robot 300 completes a retreat. To determine whether picking is possible, for example, it is only necessary to determine the difference between images before and after picking. Therefore, capturing of an image for determining whether picking is possible can be completed within a short time, as compared with image capturing for three-dimensional measurement. The three-dimensional measurement apparatus 100 transmits, to the processing apparatus 200, the image for determining whether picking is possible, and the processing apparatus 200 determines based on the image whether there exists a pickable candidate work. As a result, if there exists a pickable work, the processing apparatus 200 transfers the information to the robot 300, and the robot 300 performs a picking operation based on the information. As a result, as compared with a case in which measurement and a picking operation are repeated every time, the three-dimensional measurement apparatus 100 according to the present invention need only perform image capturing for determining whether picking is possible, and need not wait for the retreat of the robot 300 by assigning priorities to the blocks. Thus, according to the present invention, it is possible to shorten a tact time. For example, in the example of the embodiment, it is possible to significantly shorten a tact time by 2.2 sec.

As described above, according to the first embodiment, by assigning priorities and performing block division, it is possible to pick candidate works from a candidate work which prevents the arm 320 from shielding the remaining candidate works as much as possible without increasing the calculation cost. This can implement the three-dimensional measurement apparatus 100 which can determine whether there exists a pickable candidate work without waiting until the arm 320 retreats from a position above the pallet 400.

Figure 9:
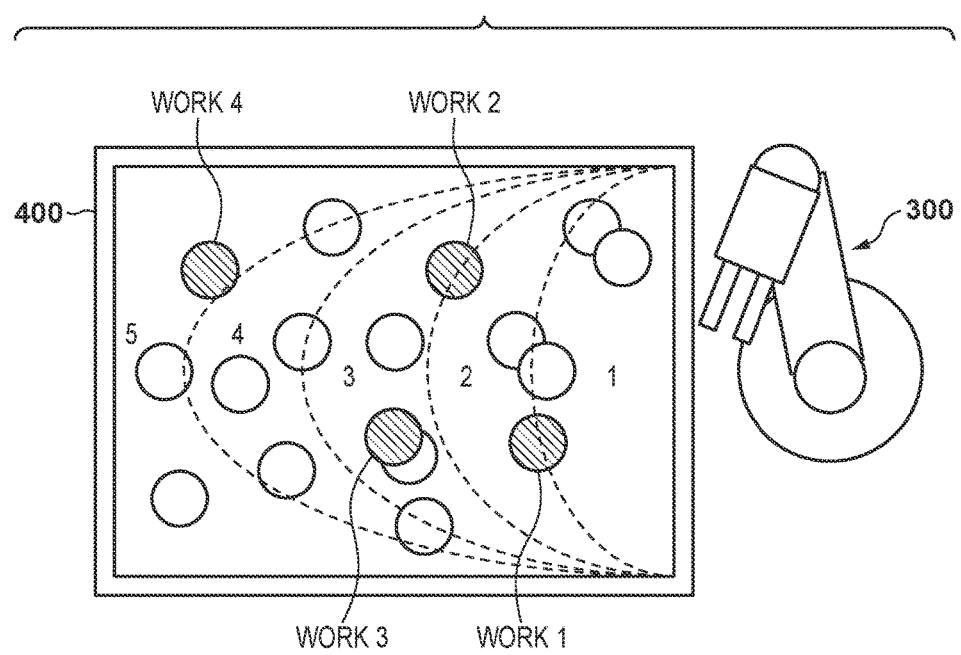
FIG. 9 is a view showing another block division method.

In this embodiment, the area in the pallet 400 is formed from rectangular blocks (partial areas). However, the area in the pallet 400 may be formed from, for example, a plurality of band-like blocks (partial areas) having different distances from the hand 310 of the robot 300 positioned at the retreat position, as shown in FIG. 9. In this embodiment, the area in the pallet 400 is divided so that respective blocks have equal areas. However, the area may be unequally divided.

Second Embodiment

The second embodiment of the present invention will be described with reference to FIG. 7. Note that the same reference numerals as those in the first embodiment denote the same components and a description thereof will be omitted. In the second embodiment, if there exist a plurality of candidate works in one block, the priorities of works for determining a picking target work from the plurality of candidate works are used.

Figure 7:
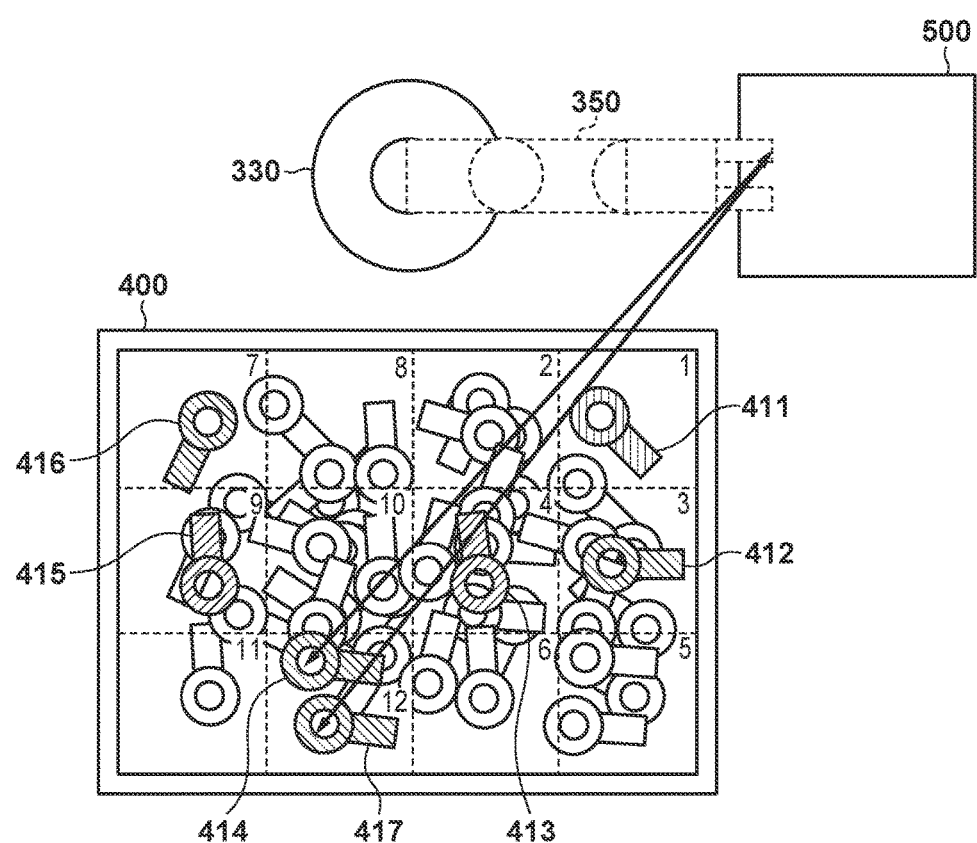
FIG. 7 is a view for explaining a method of assigning priorities to works positioned in the same block according to the second embodiment.

Referring to FIG. 7, there are two candidate works, that is, a fourth candidate work 414 and a seventh candidate work 417 in a block assigned with the 12th priority. At this time, when seen from a retreat position 350 of a robot 300, the seventh candidate work 417 is at a position deeper than that of the fourth candidate work 414. Thus, it is understood that if an attempt is made to pick the seventh candidate work 417 first, an arm 320 and a hand 310 shield the fourth candidate work 414. Therefore, in the second embodiment, if there exist a plurality of candidate works in one block, the distance between each candidate work and the gripping portion of the robot 300 positioned at the retreat position or a conveyance destination 500 is obtained, and a candidate work having a shorter distance is determined as a picking target work.

In the example of FIG. 7, distances from the distal end of the gripping portion of the robot 300 at the retreat position 350 of the robot 300 to gripped portions of the fourth candidate work 414 and seventh candidate work 417, which are indicated by thick arrows in FIG. 7, are calculated. As a result, since the distance to the fourth candidate work 414 is shorter than that to the seventh candidate work 417, the priority of the fourth candidate work 414 is set higher.

The result of priority setting based on the distances is used to determine, if there exist a plurality of candidate works in one block, the picking sequence of the plurality of candidate works. Priorities among a plurality of candidate works of different blocks comply with priorities assigned to the blocks in which the respective candidate works are positioned, as in the example of the first embodiment. Consequently, in the example of FIG. 7, the picking sequence of the respective candidate works is set to "first candidate work 411→second candidate work 412→third candidate work 413→sixth candidate work 416→fifth candidate work 415→fourth candidate work 414→seventh candidate work 417".

Figure 8:
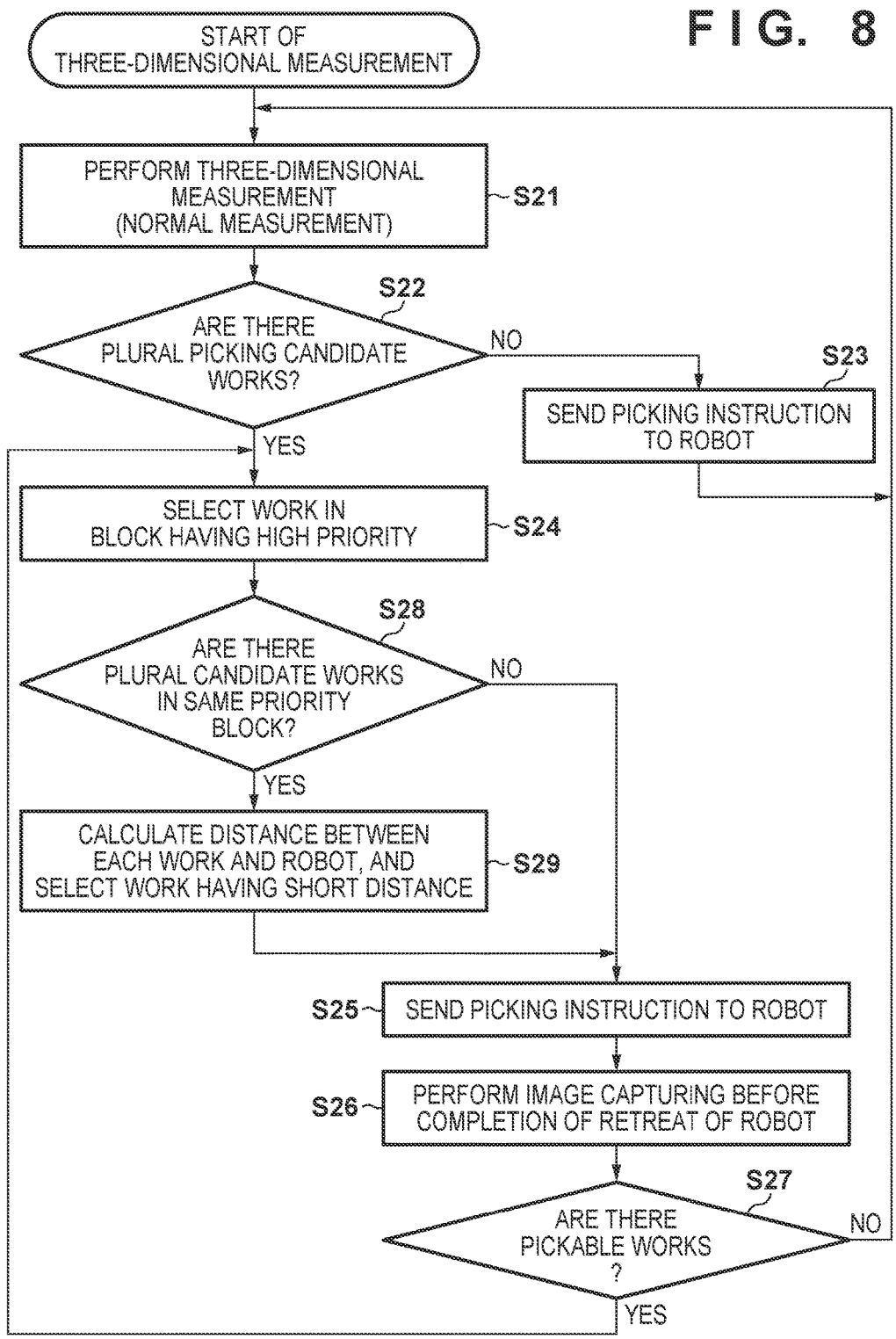
FIG. 8 is a flowchart illustrating image capturing and picking according to the second embodiment.

The procedure of measurement and picking according to this embodiment will be described with reference to FIG. 8. The procedure of FIG. 8 is different from that of FIG. 5 of the first embodiment in that after selecting, in step S24, a candidate work in a block having a high priority, it is determined in step S28 whether there exist a plurality of candidate works in the block. At this time, if it is determined that there are no plurality of candidate works in the same block, the process advances to step S25 and a processing apparatus 200 commands the robot 300 to pick the candidate work, similarly to the first embodiment.

On the other hand, if it is determined that there exist a plurality of candidate works in the block, the process advances to step S29, and the processing apparatus 200 calculates the distance between each candidate work and the robot 300, and determines, as the next picking target work, a candidate work having the shortest distance. The process advances to step S25. The subsequent procedure is the same as in the first embodiment.

According to the second embodiment, even if there exist a plurality of candidate works in one block, it is possible to pick the candidate works from a candidate work which prevents the arm 320 from shielding the remaining candidate works by calculating the distance between each candidate work and the robot 300. This can implement a three-dimensional measurement apparatus 100 which can determine whether there exists a pickable candidate work without waiting until the arm 320 retreats from a position above a pallet 400.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166183, filed Aug. 25, 2015, which is hereby incorporated by reference herein in its entirety.

What is claimed is:

1. A processing apparatus for determining a work to be picked by a robot from a plurality of works, using an image, captured by an image capture device, of an area on which the plurality of works are placed, wherein
each of a plurality of partial areas of the area is assigned with a priority for a picking sequence, and
wherein, when the robot picks a work positioned in one partial area, the priority for picking sequence is based on an area value of other partial areas shielded by the robot with respect to the image capture device, and
the processing apparatus is configured to
obtain information of positions and orientations of the plurality of works based on the image,
select a pickable candidate work among the plurality of works based on the information,
determine, if there exist a plurality of candidate works, as a picking target work, a candidate work positioned in the partial area assigned with a highest priority among the partial areas where the plurality of candidate works are respectively positioned,
select, as a next pickable candidate work, a candidate work whose position and orientation have changed within allowable ranges before and after picking, based on a result of comparison between an image of the area captured again by the image capture device after picking the target work and a preceding image captured by the image capture device before picking the target work, and
determine, if there exist a plurality of next pickable candidate works, as a next picking target work, a next pickable candidate work positioned in the partial area assigned with the highest priority among the partial areas where the plurality of next pickable candidate works are respectively positioned.

2. The apparatus according to claim 1, wherein the processing apparatus is configured to assign the priorities before the image capture device captures the preceding image.

3. The apparatus according to claim 1, wherein if there exist a plurality of candidate works in one partial area, the processing apparatus is configured to determine the target work based on a distance between each of the plurality of candidate works and a gripping portion of the robot before performing picking.

4. The apparatus according to claim 3, wherein the distance is a distance between a gripped portion of each of the plurality of candidate works and the gripping portion of the robot positioned at one of a retreat position and a conveyance destination.

5. The apparatus according to claim 1, wherein if there exists one candidate work, the processing apparatus is configured to determine the candidate work as the target work.

6. The apparatus according to claim 1, wherein the area includes a plurality of rectangular partial areas.

7. The apparatus according to claim 1, wherein the area includes a plurality of band-like partial areas having different distances from an arm of the robot.

8. A method of determining a work to be picked by a robot from a plurality of works, using an image, captured by an image capture device, of an area on which the plurality of works are placed, comprising:
assigning a priority for a picking sequence to each of a plurality of partial areas of the area,
wherein, when the robot picks a work positioned in one partial area, the priority for picking sequence is based on an area value of other partial areas shielded by the robot with respect to the image capture device;
obtaining information of positions and orientations of the plurality of works based on the image;
selecting a pickable candidate work among the plurality of works based on the information;
determining, if there exist a plurality of candidate works, as a picking target work, a candidate work positioned in the partial area assigned with a highest priority among the partial areas where the plurality of candidate works are respectively positioned;
selecting, as a next pickable candidate work, a candidate work whose position and orientation have changed within allowable ranges before and after picking, based on a result of comparison between an image of the area captured again by the image capture device after picking the target work and a preceding image captured by the image capture device before picking the target work; and
determining, if there exist a plurality of next pickable candidate works, as a next picking target work, a next pickable candidate work positioned in the partial area assigned with the highest priority among the partial areas where the plurality of next pickable candidate works are respectively positioned.

9. A non-transitory computer-readable storage medium storing a program for causing a computer to execute a method of determining a work to be picked by a robot from a plurality of works, using an image, captured by an image capture device, of an area on which the plurality of works are placed, the method comprising:
assigning a priority for a picking sequence to each of a plurality of partial areas of the area,
wherein, when the robot picks a work positioned in one partial area, the priority for picking sequence is based on an area value of other partial areas shielded by the robot with respect to the image capture device;
obtaining information of positions and orientations of the plurality of works based on the image;
selecting a pickable candidate work among the plurality of works based on the information;
determining, if there exist a plurality of candidate works, as a picking target work, a candidate work positioned in the partial area assigned with a highest priority among the partial areas where the plurality of candidate works are respectively positioned;
selecting, as a next pickable candidate work, a candidate work whose position and orientation have changed within allowable ranges before and after picking, based on a result of comparison between an image of the area captured again by the image capture device after picking the target work and a preceding image captured by the image capture device before picking the target work; and determining, if there exist a plurality of next pickable candidate works, as a next picking target work, a next pickable candidate work positioned in the partial area assigned with the highest priority among the partial areas where the plurality of next pickable candidate works are respectively positioned.

10. A picking system for picking a work from an area on which a plurality of works are placed, and conveying the work to a conveyance destination, comprising:
   an image capture device configured to capture the area on which the plurality of works are placed;
   a processing apparatus configured to determine a work to be picked from the plurality of works, using an image, captured by the image capture device, of the area on which the plurality of works are placed, and
   a robot configured to pick the work determined by the processing apparatus, and convey the work to the conveyance destination,
   wherein
   each of a plurality of partial areas of the area is assigned with a priority for a picking sequence, and
   wherein, when the robot picks a work positioned in one partial area, the priority for picking sequence is based on an area value of other partial areas shielded by the robot with respect to the image capture device, and
   the processing apparatus is configure to
   obtain information of positions and orientations of the plurality of works based on the image,
   select a pickable candidate work among the plurality of works based on the information,
   determine, if there exist a plurality of candidate works, as a picking target work, a candidate work positioned in the partial area assigned with the highest priority among the partial areas where a plurality of candidate works are respectively positioned,
   select, as a next pickable candidate work, a candidate work whose position and orientation have changed within allowable ranges before and after picking, based on a result of comparison between an image of the area captured again by the image capture device after picking the target work and a preceding image captured by the image capture device before picking the target work, and
   determine, if there exist a plurality of next pickable candidate works, as a next picking target work, a next pickable candidate work positioned in the partial area assigned with the highest priority among the partial areas where the plurality of next pickable candidate works are respectively positioned.

* * * * *